United States Patent
Trossen et al.

(10) Patent No.: US 6,798,773 B2
(45) Date of Patent: Sep. 28, 2004

(54) PHYSICALLY SCOPED MULTICAST IN MULTI-ACCESS NETWORKS

(75) Inventors: Dirk Trossen, Arlington, MA (US); Govind Krishnamurthi, Arlington, MA (US); Hemant M. Chaskar, Woburn, MA (US)

(73) Assignee: Nokia, Inc., Irving, TX (US)

( * ) Notice: Subject to any disclaimer, the term of this patent is extended or adjusted under 35 U.S.C. 154(b) by 13 days.

(21) Appl. No.: 09/987,198

(22) Filed: Nov. 13, 2001

(65) Prior Publication Data

US 2003/0091021 A1 May 15, 2003

(51) Int. Cl.[7] .............................. H04L 12/56; H04J 3/26; H04J 3/24
(52) U.S. Cl. .................... 370/390; 370/432; 370/474
(58) Field of Search ................................. 370/349, 432, 370/389, 390, 392, 401, 474, 901

(56) References Cited

U.S. PATENT DOCUMENTS

| | | | |
|---|---|---|---|
| 6,128,666 A * 10/2000 | Muller | .......................... | 709/238 |
| 6,215,766 B1 * 4/2001 | Ammar et al. | .............. | 370/229 |
| 6,240,089 B1 * 5/2001 | Okanoue et al. | ............ | 370/390 |
| 6,311,058 B1 * 10/2001 | Wecker et al. | .............. | 455/418 |
| 6,385,647 B1 * 5/2002 | Willis et al. | ................. | 709/217 |
| 6,625,773 B1 * 9/2003 | Boivie et al. | ................ | 714/749 |
| 6,674,760 B1 * 1/2004 | Walrand et al. | ............. | 370/411 |
| 2002/0026482 A1 * 2/2002 | Morishige et al. | ........... | 709/206 |
| 2002/0143951 A1 * 10/2002 | Khan et al. | .................. | 709/227 |

OTHER PUBLICATIONS

Meyer, D., Administratively Scoped IP Multicast, printed from http://www.ietf.org/rfc/rfc2365.txt?number=2365 . . . Administratively Scoped IP Multicast dated Jul., 1998 (8 pages).

Handley, et al., M., Multicast–Scope Zone Announcement Protocol (MZAP), printed from http://www.ietf.org/rfc/rfc2776.txt?number=2776 . . . Multicast–Scope Zone Announcement Protocol (MZAP) dated Feb. 2000 (26 pages).

Internet Protocol (IP) Multicast, *Technology Overview*, printed from ftp://ftpeng.cisco.com/impulticast/whitepapers/technology_overview/index.html, on Sep. 18, 2001 (15 pages).

* cited by examiner

*Primary Examiner*—Seema S. Rao
*Assistant Examiner*—Ronald Abelson
(74) *Attorney, Agent, or Firm*—Banner & Witcoff, Ltd.

(57) ABSTRACT

An apparatus and method is provided for forwarding multicast packets in a communication network using a physically scoped routing protocol. Each of a plurality of access routers maintains information concerning the addresses of physically neighboring access routers. Multicast packets received by each access router are evaluated to determine whether they should be routed using a conventional administratively scoped routing rule or using a physically scoped routing rule. Administratively scoped packets are routed to the multicast address using conventional administrative scoping rules. Physically scoped packets are "tunneled" by encapsulating them in a unicast packet, which is then transmitted to one or more physically neighboring access routers. An optional time-to-live parameter allows multiple levels of neighboring proximity to be specified.

34 Claims, 9 Drawing Sheets

PHYSICALLY SCOPED MULTICAST IN MULTI-ACCESS NETWORKS

FIELD OF THE INVENTION

The invention relates generally to telecommunication networks. More particularly, the invention concerns a mechanism for physically limiting the scope of multicast messages in such networks.

BACKGROUND OF THE INVENTION

Telecommunication networks for mobile devices generally allow mobile devices to move geographically by "handing off" localized communication links among transmission towers and associated base stations. For example, such networks allow Internet Protocol-enabled devices such as wireless Personal Digital Assistants (PDAs) and mobile computers to move about geographically dispersed areas while maintaining a connection to the Internet.

As is well known, mobile terminals can be served by one or more access routers that service terminals within a particular area. Such access routers allow the mobile terminals to access one or more computer networks, such as the Internet, using mobile IP protocols or other protocols. Mobile terminals may communicate using one of various access technologies, such as GPRS, Bluetooth, or others.

As mobile services have become more widespread, the need has increased for users of mobile terminals to have access to devices that are located within a reasonably close geographic proximity to the user at a particular point in time. For example, the user of a wireless PDA may move into an office building and have a need to print out a document at a printer located in the office building. Aside from determining the precise geographic location of the user and all printers in the building (e.g., using GPS technology), there is no easy way to determine which printer or printers might be available for printing the document, particularly if devices within the building are connected through a different administrative domain from the access router that is serving the mobile terminal. Although multicast messages can be used to send service inquiries to destinations of indeterminate specificity, using such messages to locate a "nearby" printer would not be feasible.

FIG. 1 illustrates the nature of the problem referred to above. Suppose that the user of a wireless PDA 100 moves into an area served by access router 101, which is coupled to a network 105 and ultimately to the Internet 106. Suppose further that a Bluetooth-enabled printer 102 is located within a close geographic proximity to PDA 100, illustrated by dashed line 104, but is serviced by a different access router 103, using a different access technology (e.g., Bluetooth). If the user of PDA 100 wants to print a document to the nearest printer, there is no easy way for the system to determine that the user should print to printer 102. The problem may be compounded by the fact that the addresses used to communicate with access router 101 and 103 lie in different administrative domains; i.e., they are "administratively scoped" rather than geographically or physically scoped.

The Internet Engineering Task Force has defined the Service Location Protocol (RFC 2165) as a standard way of discovering services in a network. Suppose that PDA 100 or access router 101 were to send a message to a multicast address requesting information on printers or other devices that are available to print a document. Conventional multicast routing protocols rely on administrative scoping rules to determine where such a message should be sent. For example, RFC 2365 ("Administratively Scoped IP Multicast," July 1998), published by the Internet Engineering Task Force, defines a local administratively scoped multicast space. The protocol is unable to determine that printer 102 is geographically close to PDA 100 because they are in different administrative domains (and possibly served by different access technologies, such as wireless LAN technology for PDA 100 and Bluetooth for printer 102). Devices such as access routers that are physically close to the mobile terminal may be many "hops" away in the IP network topology, and therefore do not appear to be visible to the mobile terminal.

Consequently, a need exists for a mechanism to permit mobile devices to identify other devices that are in the same geographic vicinity even though they may reside within different administrative domains. A further need exists to permit mobile devices to send multicast messages to devices within a particular geographic area irrespective of administrative domains that are associated with the devices.

SUMMARY OF THE INVENTION

The invention provides a system and method for multicast packet delivery that is based on physical neighborhood information. Each of a plurality of access routers maintains information concerning neighboring devices (e.g., access routers).

Multicast packets arriving at an access router are classified as either physically scoped or administratively scoped. Physically scoped packets are "tunneled" by encapsulating them in a unicast packet, based on locally available physical neighborhood information, and sent via unicast to physically adjacent access routers.

Administratively scoped packets are handled using conventional administrative scoping protocols.

Devices that transmit packets to an access router indicate whether each packet should be administratively or physically scoped. In one variation, physical scoping is determined by the sender specifying a maximum number of hops between access routers. A device can transmit packets to a nearby device by transmitting a physically scoped multicast packet.

Other features and advantages of the invention will become apparent through the following detailed description, the figures, and the claims.

DETAILED DESCRIPTION OF THE INVENTION

Figure 1:
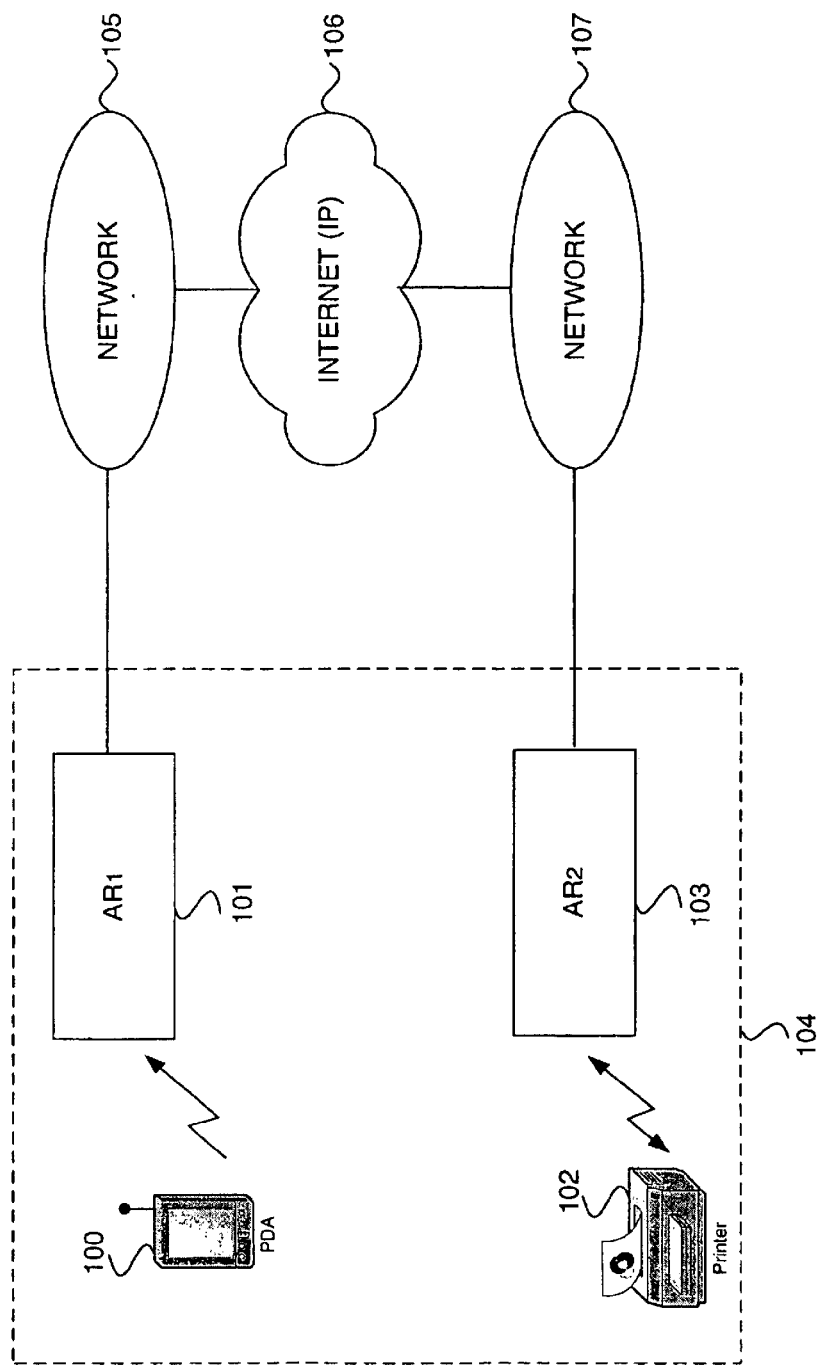
FIG. 1 shows a conventional system suffering from an "invisibility" problem wherein a mobile terminal 100 is unable to determine that a printer 102 is located nearby.
Figure 2A:
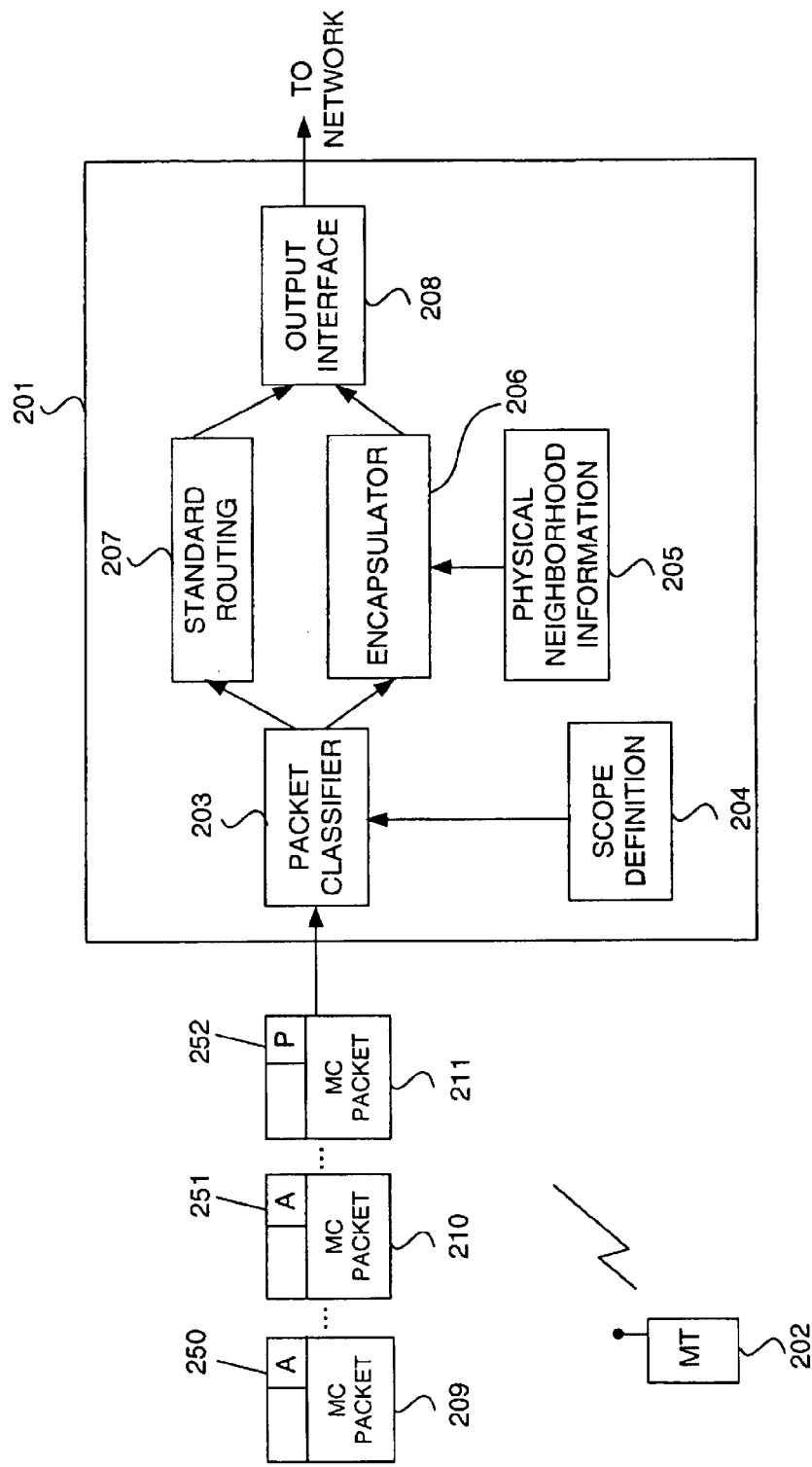
FIG. 2A shows a packet forwarder 201 that receives and handles physically scoped packets according to one embodiment of the present invention.

FIG. 2A shows one embodiment of a system according to the present invention. It is assumed that a mobile terminal 202 communicates with an access router (not shown) that incorporates a packet forwarding function 201. It should be noted, however, that the invention is not limited to mobile terminals as the invoking entity. Any device connected to an access router or other network access point can be used in accordance with the inventive principles.

Mobile terminal 202 transmits multicast packets 209, 210, and 211, each including a flag or bit (250, 251, 252) indicating whether the packet should be scoped administratively (A) or physically (P). Packets that are to be scoped administratively are handled according to conventional administrative schemes, such as set forth in RFC 2365 (e.g., they are transmitted to devices that meet administrative network criteria corresponding to the multicast address). Packets that are to be scoped physically, however, are treated differently as set forth below. It is assumed that mobile terminal 202 or an application program associated with mobile terminal 202 inserts a flag (250, 251, 252) into each multicast packet indicating whether administrative or physical scoping is desired.

In one variation of the invention, physical neighbor scope can be distributed using the Multicast-Scope Zone Announcement Protocol (MZAP, described in RFC 2776) by defining a physical scope in the Internet Protocol and appropriately incorporating this scope in MZAP. Alternatively, it can be defined statically or dynamically using other schemes.

Packet forwarder 201 includes a packet classifier function 203 that determines on the basis of the scoping flag (250, 251 or 252) whether a particular packet should be routed according to an administrative scope or a physical scope. Packets that are to be administratively scoped are routed through a standard routing function 207 using a scope definition table 204 as is conventional. Packets that are to be physically scoped, however, are diverted to a packet encapsulator 206, which converts the multicast packet into one or more unicast packets, each of which is routed to one or more local neighbors using physical neighborhood information 205. Physical neighborhood information 205 contains information concerning the addresses of devices (e.g., access routers) that are physically near the access router that contains packet forwarding function 201. Details regarding how the physical neighborhood information 205 can be derived are provided below.

The functions shown in FIG. 2A can be implemented using a general-purpose computer programmed with computer-executable instructions that perform the illustrated functions, including functions illustrated as method steps in other figures described herein.

It will be appreciated that the determination of physical versus administrative scoping can be based on context (e.g., a default value for all packets, or scoping based on type of mobile terminal or application program), instead of requiring that each packet include an indication of the desired scoping. Moreover, according to one variation of the invention, the sender of a physically scoped packet can specify the degree of proximity to be used when forwarding the packet. For example, the sender can specify a "single-hop" relationship (e.g., access routers that are one degree of separation away), or a "multi-hop" relationship (e.g., access routers that are two or more degrees of separation from the forwarding access router). Further examples of this scheme are provided below.

Figure 3A:
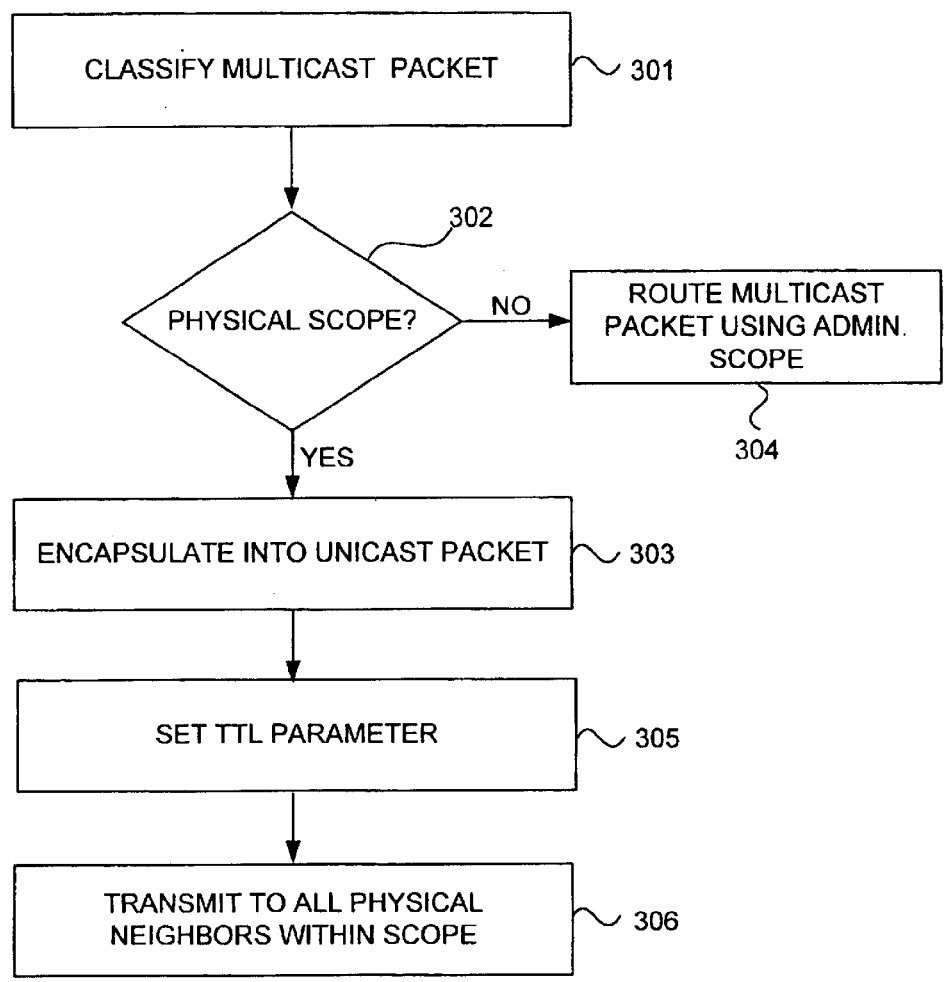
FIG. 3A shows a method of handling multicast packets using physical scoping according to one embodiment of the present invention.

FIG. 3A shows a method of routing multicast packets according to one variation of the invention. In step 301, each multicast packet arriving at an access router is classified to determine the type of routing scope that is desired. In step 302, if physical scoping is not desired, then in step 304 the multicast packet is routed using conventional administrative scoping rules. If in step 302 the packet is indicated for physical scoping, then in step 303 the multicast packet is encapsulated into a unicast packet (e.g., it is "tunneled"). If in step 305 the sender has specified the number of "hops" (e.g., degrees of proximity) that are to be used when routing the packet, a corresponding time-to-live (TTL) parameter is inserted into the packet.

The TTL parameter can be used by neighboring access routers to determine whether the packet should be further forwarded to other neighboring access routers (e.g., neighbors of neighbors). Each recipient access router decrements the TTL value in the packet and, if it is zero, inhibits further forwarding of the packet. This feature allows the sender to specify a physical scope for forwarding the packet.

Alternatively, each access router can store information regarding distant access routers (e.g., hierarchical information), so that a TTL parameter is not needed. In other words, a given access router may store information regarding networks of neighboring access routers, indicating for each the degree of separation from the forwarding access router, and it can use this information to determine the specific access routers to which the packet should be forwarded.

Finally, in step 306, the unicast packet is transmitted to all physical neighbors within the desired scope.

In one embodiment, the desired scope defaults to one physical neighbor (i.e., the packet will be replicated and transmitted to every access router that is one "hop" away from the receiving access router). In other embodiments, each transmitting mobile terminal may indicate the degree of proximity that is desired for physical scoping.

For example, the mobile terminal may indicate that the packet should be forwarded to all access routers that are within two "hops" of the receiving router, where the "hops" are determined with reference to a physical scoping table as explained below with reference to FIG. 4.

Figure 2B:
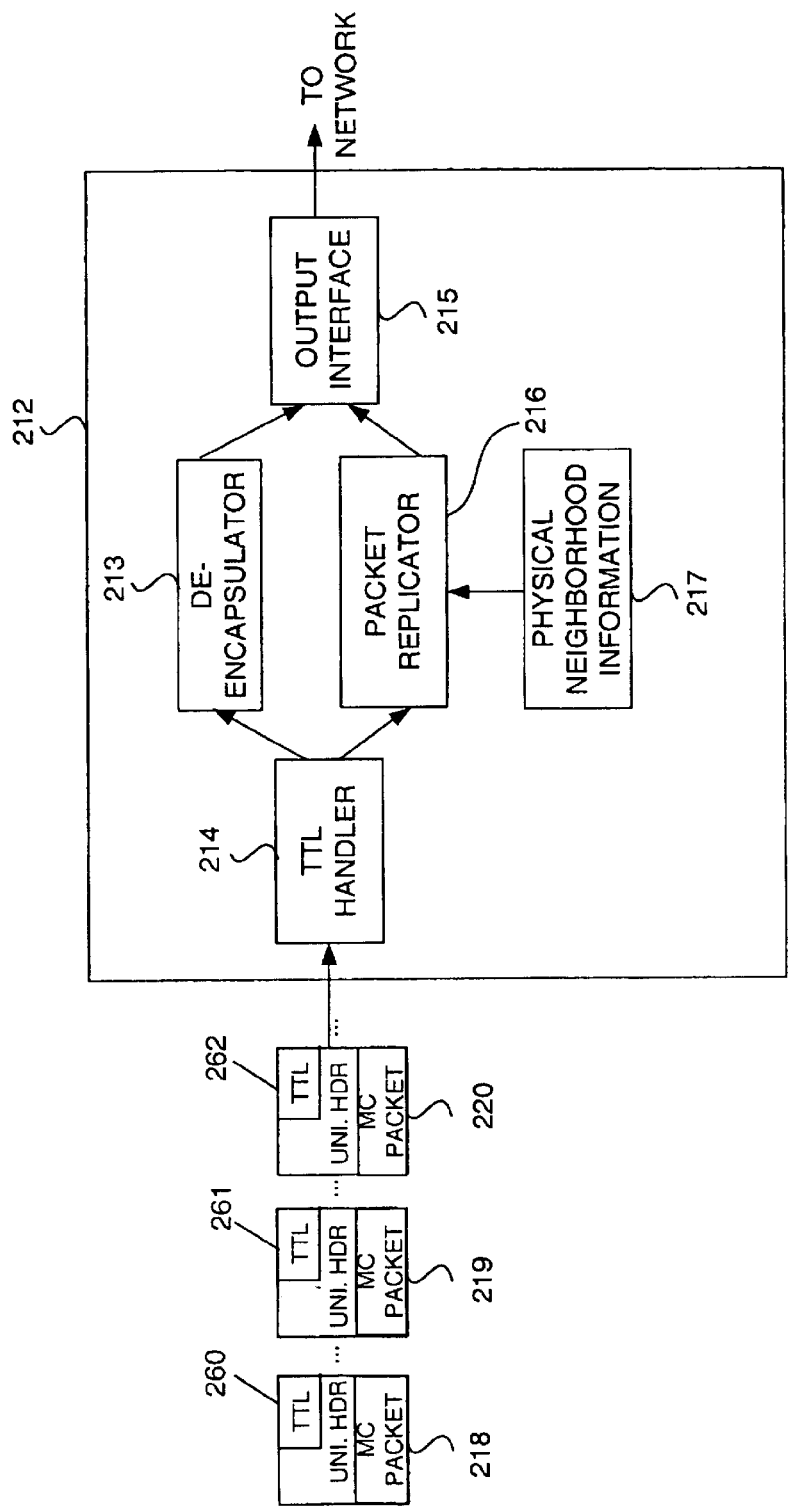
FIG. 2B shows a packet forwarder 212 that receives tunneled multicast packets and de-encapsulates and replicates such packets according to one embodiment of the present invention.

FIG. 2B shows how "tunneled" multicast packets 218, 219, 220 can be processed in an access router or other access device using a function 212. In some variations of the invention, each access router includes both a packet forwarding function 201 as shown in FIG. 2A and a tunneled packet handling function 212 as shown in FIG. 2B.

Incoming tunneled multicast packets 218, 219, 220 are received at a time-to-live handler function 214, which extracts and decrements the TTL parameter (260, 261, 262) in each packet. It is assumed that each tunneled packet comprises a normal unicast header and the original multicast packet. (Although not explicitly shown, packets that do not include tunneled multicast packets are handled normally, without the specialized processing in FIG. 2B).

The original multicast packet is then reconstructed by de-encapsulating the content (i.e., converting the unicast packet back into its original multicast content) in de-encapsulator 213. The original multicast packet is then relayed to all devices that are locally connected to the access router through output interface 215.

If the TTL field is still non-zero, the packet is replicated in packet replicator 216 using physical neighborhood information 217 and output through interface 215. This essentially perpetuates the "tunneled" multicast packets to other neighbors, which are more than one "hop" away physically from the originating sender. This process is repeated at each receiving access router until the TTL field is zero.

Figure 3B:
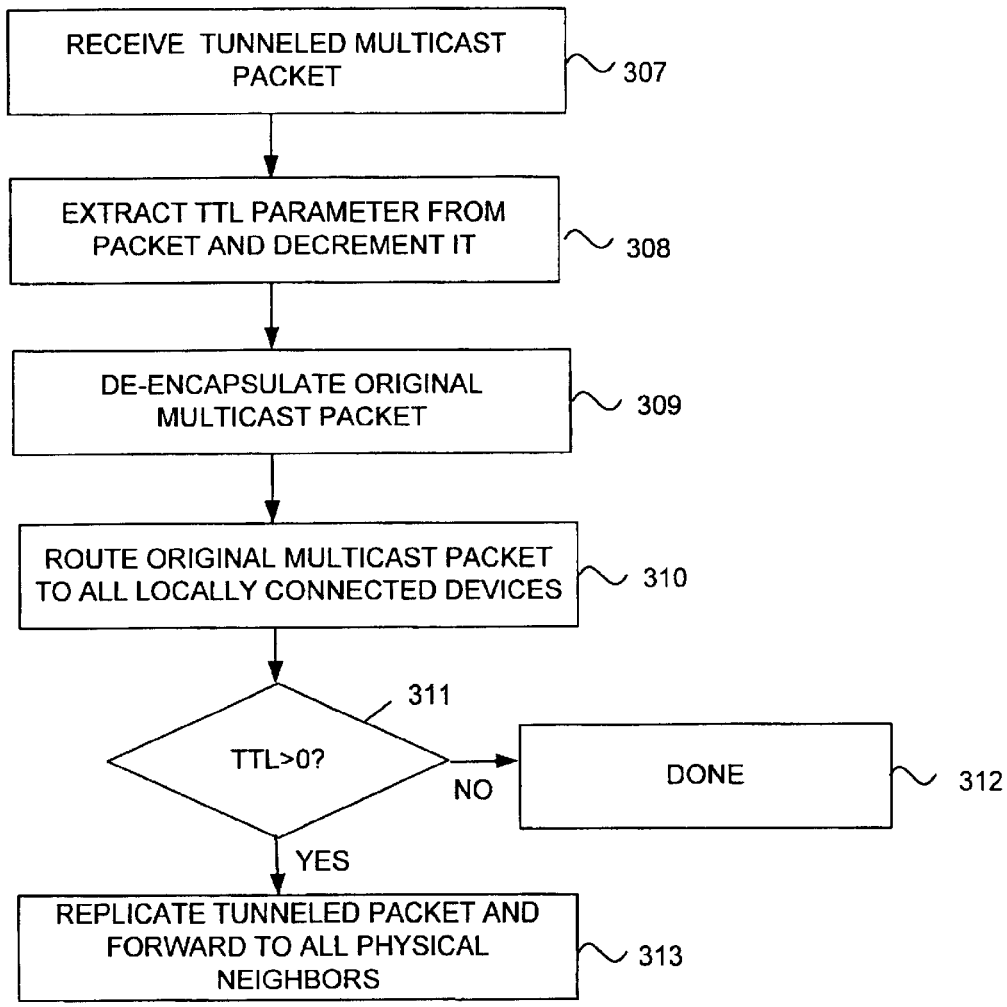
FIG. 3B shows a method of de-encapsulating and replicating tunneled multicast packets according to one embodiment of the present invention.

FIG. 3B shows a method of carrying out steps corresponding to the structure shown in FIG. 2B. In step 307, the tunneled multicast packet is received in the access router.

In step 308, the TTL parameter is extracted from the packet and decremented. In step 309, the original multicast packet is de-encapsulated (i.e., the unicast header is stripped off). In step 310, the original multicast packet is routed to all devices locally connected to the access router (e.g., printer servers or other devices). If in step 311 the TTL parameter is not greater than zero, then processing is completed per step 312.

Otherwise, in step 313, the tunneled multicast packet is replicated and forwarded to all physical neighbors within the physical neighborhood scope (i.e., separate unicast packets are sent to each physical neighbor with the encapsulatated multicast packet).

Figure 4:
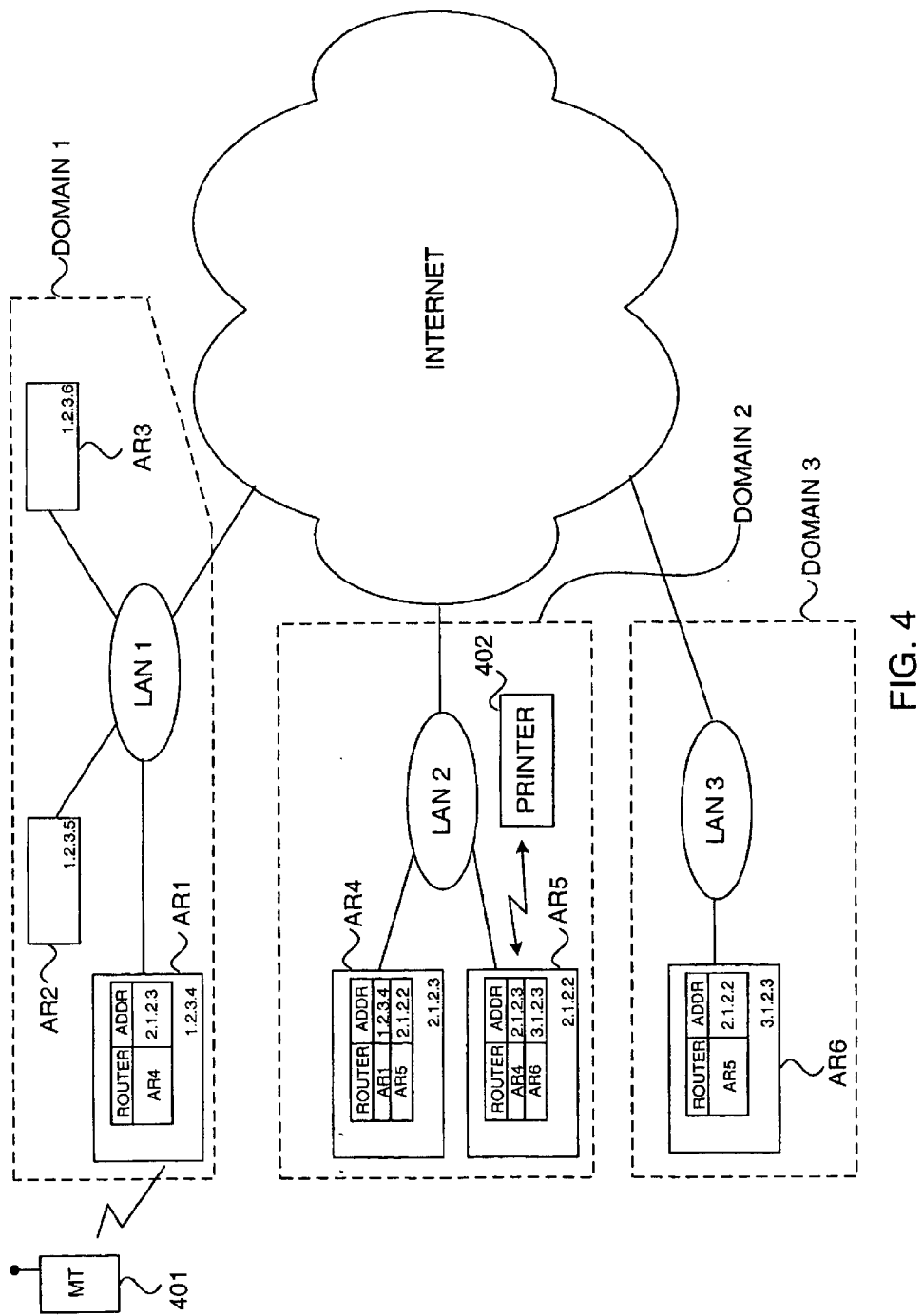
FIG. 4 shows a system in which a mobile terminal is able to transmit multicast packets to neighboring devices in different administrative domains.

FIG. 4 shows a system in which a mobile terminal is able to transmit multicast packets to neighboring devices in different administrative domains. As shown in FIG. 4, mobile terminal 401 communicates with a first access router AR1, which is connected to two other access routers AR2 and AR3, all located within a first administrative domain identified as DOMAIN1. Access router AR1 may have an IP address of 1.2.3.4; AR2 may have an IP address of 1.2.3.5; and AR3 may have an IP address of 1.2.3.6, all located within administrative domain DOMAIN1. As illustrated in FIG. 4, these three access routers are coupled via a network such as LAN1, which is in turn connected to the Internet.

As shown in FIG. 4, administrative domain DOMAIN2 includes access routers AR4 and AR5, and administrative domain DOMAIN3 includes access router AR6. Access router AR4 is identified by IP address 2.1.2.3, and AR5 is identified by address 2.1.2.2. Similarly, AR6 in DOMAIN3 is identified by IP address 3.1.2.3. It will be appreciated that although IP addresses are shown to identify communication endpoints for each access router, other addressing schemes may be used without departing from the inventive principles.

In one sense, the term "administrative domain" implies that a conventional administratively scoped multicast message forwarded to access router AR1 would also be automatically forwarded to AR2 and AR3. More generally, "administrative domain" refers to the fact that the scope of a multicast message is determined by an administrative decisionmaking process, rather than determination of geographic proximity between devices. According to the invention, multicast packets can be routed independently of conventional administrative domain schemes, and can instead be selectively routed based on physical proximity between devices.

According to one aspect of the invention, AR1 includes a table indicating that access router AR4 (having IP address 2.1.2.3) is a physically neighboring access router.

Similarly, AR4 contains a table indicating that AR1 and AR5 are neighbors; AR5 contains a table indicating that AR4 and AR6 are neighbors; and AR6 contains a table indicating that AR5 is a neighbor. These tables may correspond to the physical neighborhood information 205 depicted in FIG. 2, or they may be incorporated into other data structures or organized differently from that shown in FIG. 4.

As shown in FIG. 4, a printer 402 is coupled to access router AR5 using a wireless access technology such as Bluetooth. According to one aspect of the invention, mobile terminal 401 is able to gain access to printer 402 by transmitting a physically scoped multicast message to AR1. The physically scoped multicast message will reach printer 402 even though it is connected to access routers located in a different administrative domain (DOMAIN2).

As explained below with reference to FIGS. 6–7, the physical neighborhood information may be learned dynamically using information received from mobile terminals as they move into service areas served by the access routers. Alternatively, the physical neighborhood information may be established by a system administrator or by other means.

The definition of a "neighboring" access router can vary depending on the circumstances. In one embodiment, a neighbor may comprise an access router having an overlapping coverage area with another access router, such that as a mobile terminal moves from one area to another, the mobile terminal is handed off between the two access routers. Such a neighbor would constitute a "one-hop" neighbor, indicating that the access routers have potentially overlapping coverage areas. On the other hand, the relationship between AR1 and AR5 would constitute a "two-hop" relationship, since a mobile terminal would need to traverse two service areas when moving between the two corresponding access routers. More generally, "neighboring" refers to physical proximity of access routers, as compared to administrative relatedness. The degree of physical proximity desirable in a particular situation (e.g., feet, miles, etc.) could vary depending on the circumstances, and does not necessarily require overlapping coverage areas.

According to the inventive principles, mobile terminal 401 can transmit a multicast packet to a "nearby" printer—in one example, two hops. The request causes a flag to be set in the packet header indicating that physical scoping is desired, and that a two-hop proximity is desired. Access router AR1 receives the packet, consults its physical neighborhood information, and determines that AR4 is a neighboring access router.

Consequently, AR1 encapsulates the multicast packet into a unicast packet and forwards the request to AR4 with a TTL parameter of one. Access router AR4 receives the unicast packet, notes that the TTL parameter is greater than zero, and consults its neighborhood information table to determine that access router AR5 is a neighbor. (Although AR1 is also a neighbor, there is no need to forward the packet back to the router from which it originated). Consequently, AR4 decrements the TTL and forwards the packet to AR5 with a TTL of zero. Furthermore, AR4 relays the original packet within its local scope, i.e., the encapsulated packet is de-encapsulated and then sent to all devices connected to AR4. Upon reception of the packet at AR5, the multicast packet is de-encapsulated and relayed to all locally connected devices, which includes printer 402. Since the TTL of the received unicast packet is zero, further forwarding to neighboring devices is suppressed.

As explained above, each access router stores information regarding neighboring access routers or other access devices. This information can be created and stored statically (e.g., a system administrator can supply the information), or it can be "learned" dynamically, as explained below in one example. Other approaches are possible, and the invention is not intended to be limited to a particular technique.

Figure 5:
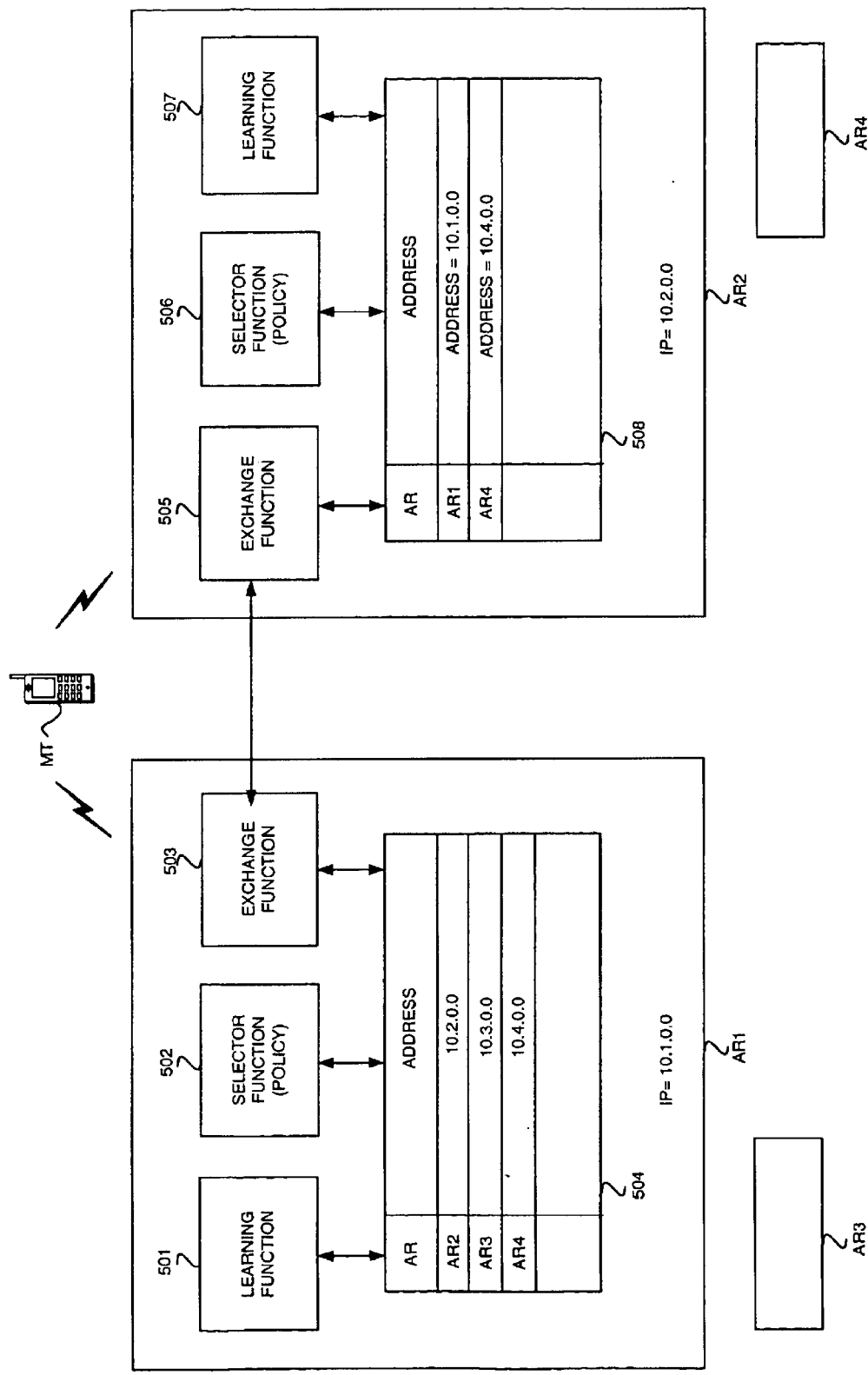
FIG. 5 shows a system that permits sharing neighborhood information between access routers in a system.

FIG. 5 shows a system that permits sharing of neighborhood information between access routers according to one variation of the invention. As shown in FIG. 5, a first access router AR1 serves a first service area (not shown) in which a mobile terminal MT may be located. Although not explicitly shown in FIG. 5, it is assumed that each access router transmits and receives data packets through one or more base stations that cover corresponding geographic areas. It is also assumed that each access router provides Internet-compatible connections (e.g., IP protocol compatibility) such that data packets received at each router can be forwarded to one or more mobile terminals within the corresponding service area. Each access router includes an IP address used for communicating directly with the access router and a block of IP addresses that can be allocated and used by the access router for communicating with mobile terminals served by the access router. For purposes of illustration, AR1 is shown as having an IP address of 10.1.0.0, and AR2 is shown as having an IP address of 10.2.0.0.

According to one aspect of the invention, each access router creates and maintains a local capability map (elements 504 and 508 in FIG. 5) that stores information concerning other access routers that are geographically adjacent. As a mobile terminal MT moves into the area serviced by an access router, the mobile terminal transmits the IP address of the access router for the service area from which the mobile terminal is leaving. In other words, each mobile terminal passes to the next access router information concerning the previously used access router (the previous router's identity, i.e., its IP address). An inference can be drawn that, by virtue of moving out of one router's service area and into another router's service area, the two routers are geographically adjacent. Once each access router knows about the other one, they can exchange capability information (e.g., IP addresses and other information) that can be used to select a target access router for future handoffs.

As shown in FIG. 5, access router AR1 includes a learning function 501, a selector function 502, and an exchange function 503. Similarly, access router AR2 contains such functions (elements 505, 506, and 507) in addition to the capabilities map 508.

Other access routers AR3 and AR4 are shown without internal details. In general, each learning function 501 and 507 receives information from mobile terminals that move into the service area associated with an access router (e.g., the IP address of the previously used access router).

Exchange functions 503 and 505 exchange capability information between two access routers in response to the learning function. For example, when mobile terminal MT is about to move out of the service area supported by AR1 and into the service area of AR2, the mobile terminal transmits to AR2 the IP address (in this case, 10.1.0.0) of the originating access router AR1. In response, learning function 507 stores the IP address of AR1 into capability map 508, and causes exchange function 505 to transmit a request (over the Internet, or through other means) to AR1 to exchange capability information. Thereafter, exchange functions 503 and 505 of the respective access routers exchange capability information concerning each respective router's capabilities. In this manner, each access router learns about capabilities and addresses of neighboring routers.

Selector functions 502 and 506 select target access routers for mobile terminals based on capability information stored in capability maps 504 and 508 respectively. These functions are not relevant to the inventive principles and are shown for completeness only.

Any or all of the functions depicted in FIG. 5 can be implemented using computer software executing on a general-purpose or special-purpose digital computer. The capabilities information can be stored in a computer memory, relational database, or other data structure. Conventional access routers can be modified to incorporate the functions illustrated in FIG. 5.

Figure 6:
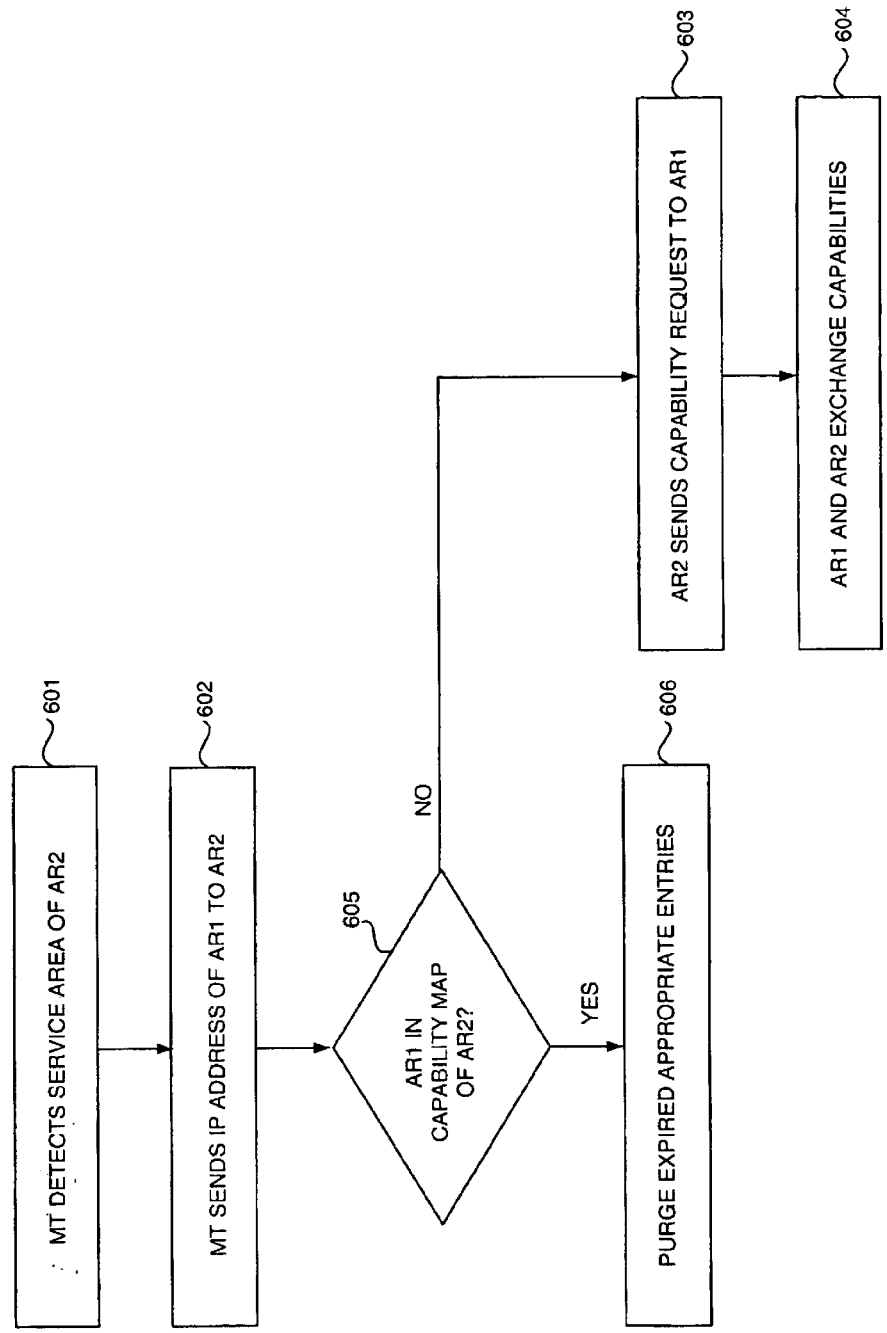
FIG. 6 shows one possible method for sharing neighborhood information between access routers in a system.

FIG. 6 shows steps of a method that can be used to learn a physical neighborhood and to share capability information among different access routers on the basis of mobile terminals moving into a service area associated with an access router. In step 601, mobile terminal MT detects service areas of AR2. In step 602, the mobile terminal sends the IP address of AR1 to AR2. In one embodiment, the IP address is not sent when the MT is switched on; instead, it is only sent during movement of the mobile terminal.

In step 605, a check is made to determine whether AR1 is in the capability map of AR2. Assuming that it is not, then in step 603, AR2 sends a request to AR1 (over the Internet, for example) requesting a list of capabilities of AR1. In step 604, AR1 and AR2 exchange capabilities (including the IP address of AR2) such that both access routers know about the capabilities of the other.

In one embodiment, entries in each router's capability map can be purged if too much time has elapsed since the last handoff occurred between them (e.g., step 606). Such purging would be done on the theory that many mobile terminals moving from one service area to another would cause a certain number of handoffs over the time period, and that absence of any handoff from a particular router after such a time might indicate that the router has been removed or disabled or its coverage area has changed, thereby altering the neighborhood map.

There are various methods of detecting movement of a mobile terminal to a new service area. In one approach, the mobile terminal assists the access router by detecting beacons of neighboring base stations associated with different access routers. This decision made by the mobile terminal to start listening to these neighborhood beacons can be made by the mobile terminal or be initiated by the AR at a time when a handover is deemed necessary. For example, the current AR's signal to the mobile terminal might be fading, or the mobile terminal's signal to the current AR might be fading, or both. One of the two entities (mobile terminal or AR) or both might decide that a handover is necessary. When the mobile terminal determines that the signal strength associated with the current access router falls below a threshold level and that the signal strength associated with a different access router is higher, the mobile terminal can initiate a handoff request using the principles outlined above.

Figure 7:
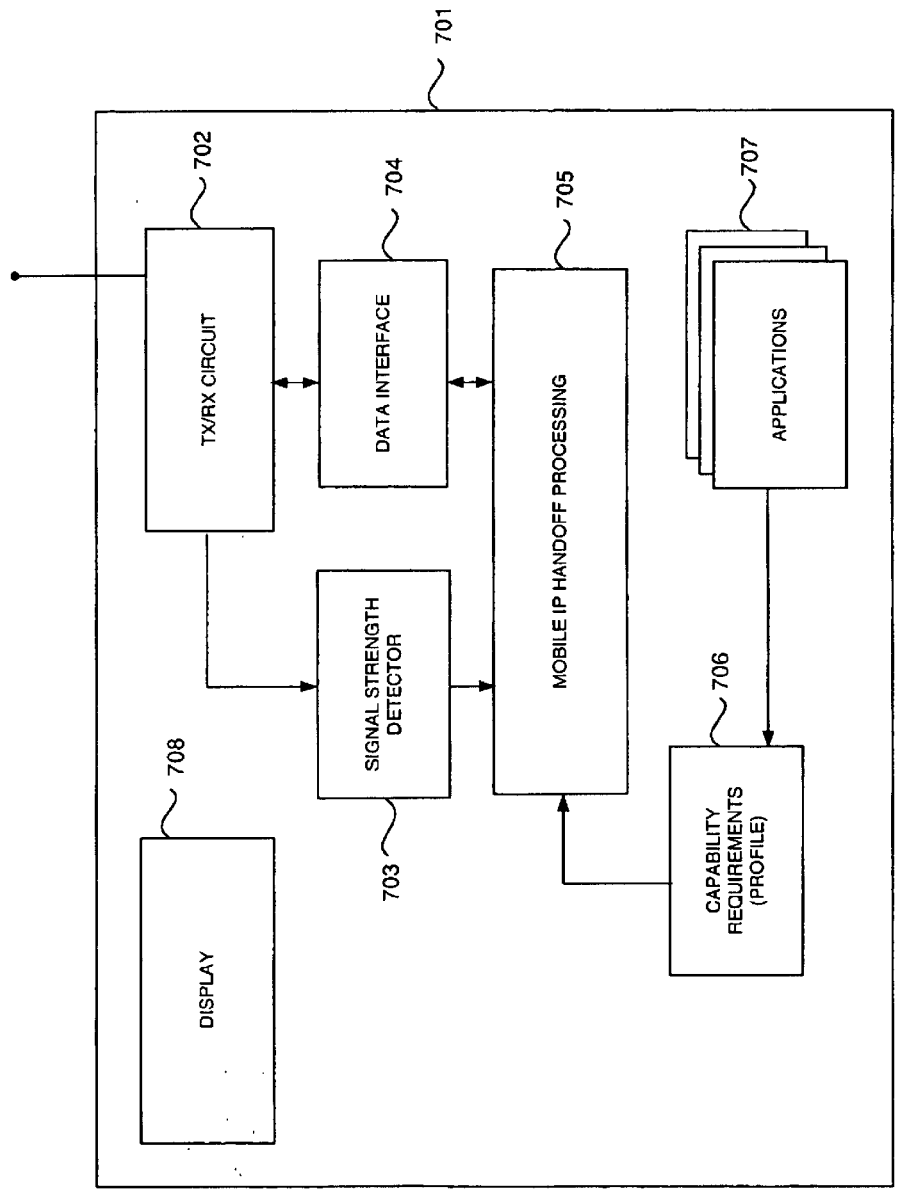
FIG. 7 shows one embodiment of a mobile terminal that facilitates sharing of access router neighborhood information across administrative domains, and that can transmit multicast data packets with a physically scoped multicast indicator.

FIG. 7 shows one possible implementation of a mobile terminal that can be used to facilitate sharing of neighboring device information and, according to one aspect of the invention, to transmit data packets including a physically scoped multicast flag.

The mobile terminal 701 includes a transmit/receive circuit 702 that communicates with one or more base stations. The base stations may be the same base stations used by conventional voice-based cellular phone networks (e.g., using CDMA or TDMA technology), or they may be separate from such phone networks. Nevertheless, circuit 702 transmits digital data comprising packets that are to be routed through the mobile network. The receiving part of the circuit receives signal strength or beacon information from base stations, which is processed by a signal strength detector 703.

Data interface circuit 704 converts digital messages into a format suitable for transmission through transmit/receive circuit 702 and vice versa. Depending on the circuit implementation, data interface 704 may not be necessary.

Mobile IP handoff processing circuit 705 makes decisions on the basis of the signal strength and previously stored capabilities requirements or profile 706. The capabilities requirements can be manually entered by a user (e.g., using a graphical user interface or keypad), or they can be automatically set depending on which of various application programs 707 are executing on the mobile terminal. Some or all of the functions shown in FIG. 7 can be implemented using application-specific integrated circuits; microprocessors programmed with software; signal processing devices; specialized circuits; or combinations of the above. Consequently, the arrangement of functions shown in FIG. 7 is not intended to imply a specific arrangement of hardware circuits. For embodiments that do not rely on the mobile terminal to perform sharing of access router information, function 706 may not be required.

According to one aspect of the invention, applications 707 can set a physically scoped multicast bit in a packet header to indicate that multicast packets transmitted to an access router should be scoped using the above-described physical scoping scheme.

The term "mobile terminal" should be understood to include IP-enabled cellular telephones; wirelessly accessible Personal Digital Assistants (PDAs) such as those manufactured by PALM Inc.; notebook computers that can communicate wirelessly;

and other mobile devices that can communicate using packetized digital communications over various transmission technologies (including CDMA, GSM, TDMA, and others) or media (radio, infrared, laser, and the like).

The term "access router" should be understood to include computer-implemented devices that route packets, such as IP packets, to addresses in a network based on routing information. Access routers are usually distinct from base stations/access points, which may rely on different transmission schemes to transmit information (e.g., GSM or CDMA). One or more base stations could be associated with a single access router. Alternatively, more than one access router could be associated with a single base station. The term "network access device" should be understood to generally refer to any type of device that allows devices (e.g., mobile terminals) to access a network. An access router is a specific type of "network access device."

The term "multicast packet" should be understood to refer to a data packet that can be delivered to multiple recipients without requiring that the sender physically transmit separate packets to each recipient. Multicast addressing is used in Internet Protocol to specify an arbitrary group of IP hosts that have joined the group and wish to receive messages addressed to the group. In contrast, "unicast packet" refers to a data packet that is sent to a single identifiable recipient.

While the invention has been described with respect to specific examples including presently preferred modes of carrying out the invention, those skilled in the art will appreciate that there are numerous variations and permutations of the above described systems and techniques that fall within the spirit and scope of the invention as set forth in the appended claims. Any of the method steps described herein can be implemented in computer software and stored on computer-readable medium for execution in a general-purpose or special-purpose computer.

We claim:

1. A method of forwarding a multicast data packet in a network, comprising the steps of:
   (1) receiving the multicast data packet at a network access device;
   (2) determining whether the multicast data packet is to be forwarded according to an administratively scoped destination or a physically scoped destination;
   (3) in response to determining that the multicast data packet is to be forwarded according to an administratively scoped destination, forwarding the multicast data packet to an administratively scoped destination; and
   (4) in response to determining that the multicast data packet is to be forwarded according to a physically scoped destination, encapsulating the multicast data packet into a unicast packet and forwarding the unicast data packet to a second network access device that is a physical neighbor of the network access device.

2. The method of claim 1, wherein step (4) comprises the steps of:
   (a) extracting a proximity value from the multicast data packet;
   (b) using the proximity value to establish a time-to-live parameter in the unicast packet; and
   (c) forwarding the unicast packet to the physical neighbor with the time-to-live parameter.

3. The method of claim 1, wherein step (4) comprises the step of forwarding the unicast packet to a plurality of neighboring network access devices.

4. The method of claim 1, wherein step (4) comprises the step of consulting a physical neighborhood table that reflects information concerning neighboring network access devices.

5. The method of claim 4, wherein step (4) comprises the step of consulting a dynamically updated physical neighborhood table that reflects information concerning neighboring access routers, wherein the table is updated on the basis of information received from one or more mobile terminals.

6. The method of claim 5, wherein step (4) comprises the step of consulting the dynamically updated physical neighborhood table that is updated on the basis of an IP address of an access router transmitted from the one or more mobile terminals.

7. The method of claim 1, wherein step (4) comprises the step of forwarding the unicast data packet to the second network access device that resides in a different administrative address domain than the network access device.

8. The method of claim 1, wherein step (2) comprises the step of checking a packet header for a flag set by a sender of the multicast data packet in order to determine whether the multicast data packet is to be forwarded according to the administratively scoped destination or the physically scoped destination.

9. The method of claim 1, further comprising the steps of:
   (5) receiving at the second network access device the unicast data packet forwarded in step (4);
   (6) decrementing a time-to-live value extracted from the unicast data packet;
   (7) extracting the original multicast data packet from the unicast data packet;

(8) relaying the multicast data packet to devices locally connected to the second network access device; and (9) if the time-to-live value exceeds a predetermined value, forwarding the unicast data packet to a third network access device that is a neighbor of the second network access device.

10. The method of claim 1, further comprising the step of dynamically collecting information concerning neighboring network access devices and using the dynamically collected information to identify physical neighbors of the network access device.

11. A method of routing a multicast data packet received from a mobile terminal, comprising the steps of:

(1) receiving the multicast data packet from the mobile terminal at a first access router located in a first administrative domain; and (2) in response to determining that the multicast data packet should be routed using a physically scoped destination, converting the multicast data packet into a unicast packet and forwarding the unicast packet to a second access router that is located in a different administrative domain but located in physical proximity to the first access router.

12. The method of claim 11, further comprising the step of:

(3) in response to determining that the multicast data packet should be forwarded according to an administratively scoped destination, forwarding the multicast data packet to an administratively scoped multicast destination.

13. The method of claim 11, wherein step (2) is performed on the basis of a dynamically updated table that reflects neighboring access routers, wherein the table is updated based on information received from one or more mobile terminals that relay information from neighboring access routers.

14. The method of claim 11, wherein step (2) comprises the steps of:

(a) extracting a proximity value from the multicast data packet;

(b) using the proximity value to establish a time-to-live parameter in the unicast packet; and (c) forwarding the unicast packet to the second access router with the time-to-live parameter.

15. The network access device comprising a processor programmed with computer-executable instructions that perform the steps of:

(1) receiving a multicast packet;

(2) determining whether the multicast packet is to be forwarded according to an administratively scoped destination or a physically scoped destination;

(3) in response to determining that the multicast packet is to be forwarded according to an administratively scoped destination, forwarding the multicast packet according to a multicast address contained in the multicast packet; and (4) in response to determining that the multicast packet is to be forwarded according to a physically scoped destination, encapsulating the multicast data packet into a unicast packet and forwarding the unicast packet to a second network access device that is a physical neighbor of the network access device.

16. The network access device of claim 15, wherein the computer-executable instructions in step (4) further perform the steps of:

(a) extracting a proximity value from the multicast packet;

(b) using the proximity value to establish a time-to-live parameter in the unicast packet; and (c) forwarding the unicast packet to the physical neighbor with the time-to-live parameter.

17. A network access device comprising a processor programmed with computer-executable instructions that perform the steps of:

(1) receiving a multicast packet;

(2) determining whether the multicast packet is to be forwarded according to an administratively scoped destination or a physically scoped destination;

(3) in response to determining that the multicast packet is to be forwarded according to an administratively scoped destination, forwarding the multicast packet according to a multicast address contained in the multicast packet; and (4) in response to determining that the multicast packet is to be forwarded according to a physically scoped destination, forwarding the multicast packet to a second network access device that is a physical neighbor of the network access device, wherein the computer-executable instructions further perform the step of converting the multicast packet into a unicast packet and forwarding the unicast packet to a second network access device that is a physical neighbor of the network access device.

18. The network access device of claim 17, wherein the computer-executable instructions further perform the step of forwarding the unicast packet to a plurality of neighboring network access devices.

19. The network access device of claim 18, wherein computer-executable instructions comprise the step of consulting a physical neighborhood table that reflects information concerning neighboring network access device.

20. The network access device of claim 19, wherein the computer-executable instructions comprise the step of consulting a dynamically updated physical neighborhood table that reflects information concerning neighboring network access devices, wherein the table is updated on the basis of information received from one or more mobile terminals.

21. The network access device of claim 20, wherein the computer-executable instructions comprise the step of consulting a dynamically updated physical neighborhood table that is updated on the basis of an IP address of a third network access device transmitted from one or more mobile terminals.

22. The network access device of claim 15, wherein the computer-executable instructions of step (4) comprise the step of forwarding the unicast packet to a second network access device that resides in a different administrative address domain from the network access device.

23. The network access device of claim 15, wherein the computer-executable instructions comprise the step of checking a packet header for a flag set by a sender of the multicast packet in order to determine whether the multicast packet is to be forwarded according to the administratively scoped destination or the physically scoped destination.

24. The network access device of claim 15, wherein the computer-executable instructions comprise the step of dynamically collecting information concerning neighboring network access devices and using the dynamically collected information to identify physical neighbors of the network access device.

25. A network access device comprising a processor programmed with computer-executable instructions that perform the steps of:

(1) receiving a unicast data packet;

(2) determining whether the unicast data packet contains a tunneled multicast data packet;

(3) in response to determining that the unicast data packet contains a tunneled multicast data packet, de-encapsulating the tunneled multicast data packet and forwarding the de-encapsulated tunneled multicast data packet to devices locally connected to the network access device; and (4) in response to determining that a time-to-live parameter in the unicast data packet is greater than a predetermined value, replicating the unicast data packet and transmitting the replicated unicast data packet to neighboring network access devices.

26. The network access device of claim 25, wherein the computer-executable instructions further perform the step of decrementing the time-to-live parameter in the unicast data packet prior to transmitting the replicated unicast data packet to neighboring network access devices.

27. An access router capable of communicating with one or more mobile terminals, comprising a processor and instructions that perform the steps of:

(1) receiving a data packet from the one or more mobile terminals;

(2) on the basis of a flag set in the received data packet, determining whether the received data packet is to be forwarded according to an administratively scoped destination or a physically scoped destination;

(3) in response to determining that the received data packet is to be forwarded according to an administratively scoped destination, forwarding the received data packet to an administratively scoped destination; and (4) in response to determining that the received data packet is to be forwarded according to a physically scoped destination, performing the steps of
(a) de-encapsulating a multicast data packet from the received data packet;
(b) transmitting the de-encapsulated multicast data packet to devices that are locally connected to the access router;
(c) extracting and decrementing a time-to-live parameter from the received data packet;
(d) in response to determining that the time-to-live parameter exceeds a predetermined threshold, replicating the received data packet using the decremented time-to-live parameter and transmitting the replicated data packet containing the decremented time-to-live parameter to one or more other access routers that are physical neighbors of the access router.

28. A method of forwarding a multicast data packet in a network, comprising the steps of:

(1) receiving the multicast data packet at a network access device;

(2) determining whether the multicast data packet is to be forwarded according to an administratively scoped destination or a physically scoped destination;

(3) in response to determining that the multicast data packet is to be forwarded according to an administratively scoped destination, forwarding the multicast data packet to an administratively scoped destination; and (4) in response to determining that the multicast data packet is to be forwarded according to a physically scoped destination, forwarding the multicast data packet to a second network access device that is a physical neighbor of the network access device, wherein step (4) comprises the steps of:
(a) extracting a proximity value from the multicast data packet;
(b) using the proximity value to establish a time-to-live parameter in a unicast packet; and
(c) forwarding the unicast packet to the physical neighbor with the time-to-live parameter.

29. A method of forwarding a multicast data packet in a network, comprising the steps of:

(1) receiving the multicast data packet at a network access device;

(2) determining whether the multicast data packet is to be forwarded according to an administratively scoped destination or a physically scoped destination;

(3) in response to determining that the multicast data packet is to be forwarded according to an administratively scoped destination, forwarding the multicast data packet to an administratively scoped destination; and (4) in response to determining that the multicast data packet is to be forwarded according to a physically scoped destination, forwarding the multicast data packet to a second network access device that is a physical neighbor of the network access device, wherein step (4) comprises the steps of:
consulting a physical neighborhood table that reflects information concerning neighboring network access devices; and
consulting a dynamically updated physical neighborhood table that reflects information concerning neighboring access routers, wherein the table is updated on the basis of information received from one or more mobile terminals.

30. A method of forwarding a multicast data packet in a network, comprising the steps of:

(1) receiving the multicast data packet at a network access device;

(2) determining whether the multicast data packet is to be forwarded according to an administratively scoped destination or a physically scoped destination;

(3) in response to determining that the multicast data packet is to be forwarded according to an administratively scoped destination, forwarding the multicast data packet to an administratively scoped destination;

(4) in response to determining that the multicast data packet is to be forwarded according to a physically scoped destination, forwarding the multicast data packet to a second network access device that is a physical neighbor of the network access device;

(5) receiving at the second network access device a unicast data packet forwarded in step (4);

(6) decrementing a time-to-live value extracted from the unicast data packet;

(7) extracting the original multicast data packet from the unicast data packet;

(8) relaying the multicast data packet to devices locally connected to the second network access device; and (9) if the time-to-live value exceeds a predetermined value, forwarding the unicast data packet to a third network access device that is a neighbor of the second network access device.

31. A method of forwarding a multicast data packet in a network, comprising the steps of:

(1) receiving the multicast data packet at a network access device;

(2) dynamically collecting information concerning neighboring network access devices and using the dynamically collected information to identify physical neighbors of the network access device;

(3) determining whether the multicast data packet is to be forwarded according to an administratively scoped destination or a physically scoped destination;

(4) in response to determining that the multicast data packet is to be forwarded according to an administratively scoped destination, converting the multicast data packet into a unicast packet and forwarding the unicast; and (5) in response to determining that the multicast data packet is to be forwarded according to a physically scoped destination, forwarding the multicast data packet to a second network access device that is a physical neighbor of the network access device.

32. A network access device comprising a processor programmed with computer-executable instructions that perform the steps of:

(1) receiving a multicast packet;

(2) determining whether the multicast packet is to be forwarded according to an administratively scoped destination or a physically scoped destination;

(3) in response to determining that the multicast packet is to be forwarded according to an administratively scoped destination, forwarding the multicast packet according to a multicast address contained in the multicast packet; and (4) in response to determining that the multicast packet is to be forwarded according to a physically scoped destination, forwarding the multicast packet to a second network access device that is a physical neighbor of the network access device, wherein the computer-executable instructions in step (4) further perform the steps of:

(a) extracting a proximity value from the multicast packet;

(b) using the proximity value to establish a time-to-live parameter in a unicast packet; and (c) forwarding the unicast packet to the physical neighbor with the time-to-live parameter.

33. A network access device comprising a processor programmed with computer-executable instructions that perform the steps of:

(1) receiving a multicast packet;

(2) determining whether the multicast packet is to be forwarded according to an administratively scoped destination or a physically scoped destination;

(3) in response to determining that the multicast packet is to be forwarded according to an administratively scoped destination, forwarding the multicast packet according to a multicast address contained in the multicast packet; and (4) in response to determining that the multicast packet is to be forwarded according to a physically scoped destination, forwarding the multicast packet to a second network access device that is a physical neighbor of the network access device, wherein the computer-executable instructions of step (4) comprise the step of forwarding a unicast packet to a second network access device that resides in a different administrative address domain from the network access device.

34. A network access device comprising a processor programmed with computer-executable instructions that perform the steps of:

(1) receiving a multicast packet;

(2) dynamically collecting information concerning neighboring network access devices and using the dynamically collected information to identify physical neighbors of the network access device;

(3) determining whether the multicast packet is to be forwarded according to an administratively scoped destination or a physically scoped destination;

(4) in response to determining that the multicast packet is to be forwarded according to an administratively scoped destination, converting the multicast packet into a unicast packet and forwarding the unicast; and (5) in response to determining that the multicast packet is to be forwarded according to a physically scoped destination, forwarding the multicast packet to a second network access device that is a physical neighbor of the network access device.

* * * * *

UNITED STATES PATENT AND TRADEMARK OFFICE
CERTIFICATE OF CORRECTION

PATENT NO. : 6,798,773 B2
DATED : September 28, 2004
INVENTOR(S) : Dirk Trossen et al.

It is certified that error appears in the above-identified patent and that said Letters Patent is hereby corrected as shown below:

Column 10,
Line 46, please replace "claim 5" with -- claim 29 --

Column 13,
Line 53, please replace "." with -- : --

Column 15,
Line 11, please replace "forwarding the unicast;" with -- forwarding the unicast packet to an administratively scoped destination; --

Column 16,
Line 37, please replace "forwarding the unicast" with -- forwarding the unicast packet according to a multicast address contained in the multicast packet --

Signed and Sealed this

Twenty-sixth Day of July, 2005

JON W. DUDAS
*Director of the United States Patent and Trademark Office*